United States Patent [19]

Dixon et al.

[11] 4,281,455
[45] Aug. 4, 1981

[54] RAZOR WITH REMOVABLY MOUNTED PIVOTAL CARTRIDGE

[75] Inventors: Richard B. Dixon, Woodley; Peter Carr, Morpeth, both of England

[73] Assignee: Wilkinson Sword Limited, Buckinghamshire, England

[21] Appl. No.: 80,280

[22] Filed: Oct. 1, 1979

[30] Foreign Application Priority Data

Oct. 20, 1978 [GB] United Kingdom ............ 41334/78

[51] Int. Cl.³ .................... B26B 21/06; B26B 21/22
[52] U.S. Cl. ........................................... 30/47; 30/89
[58] Field of Search ...................... 30/47, 57, 87, 89

[56] References Cited
U.S. PATENT DOCUMENTS

| 3,810,305 | 5/1974 | Perry  | 30/47 |
| 4,026,016 | 5/1977 | Nissen | 30/47 |
| 4,083,104 | 4/1978 | Nissen | 30/47 |
| 4,094,063 | 6/1978 | Trotta | 30/47 |
| 4,198,746 | 4/1980 | Trotta | 30/47 |

Primary Examiner—Gary L. Smith

[57] ABSTRACT

The invention provides a razor assembly comprising a shaving unit and a handle. The shaving unit has a platform, a blade, pivotal mounting for pivotally connecting the shaving unit to the handle, and apparatus for receiving a biasing force from the handle. The handle includes two flexible arms which at one end have pivotal mounting apparatus complementary to the shaving unit's pivotal mounting apparatus, the flexible arms being secured to the handle in a region spaced from the handle's pivotal mounting apparatus. A movable button engages the flexible arms and is movable for flexing the arms to disengage the handle's pivotal mounting apparatus from the shaving unit's pivotal mounting apparatus and for reverse movement which frees the flexible arms for engagement of the handle's pivotal mounting apparatus with the shaving unit's pivotal mounting apparatus. The handle also includes apparatus for exerting a biasing force on the shaving unit's apparatus for receiving a biasing force.

3 Claims, 12 Drawing Figures

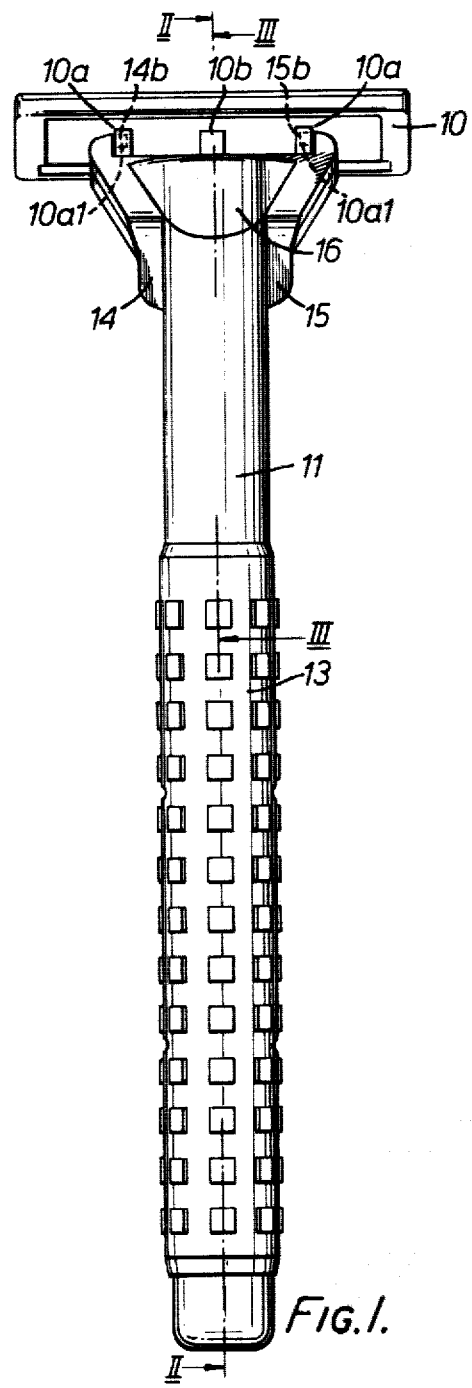
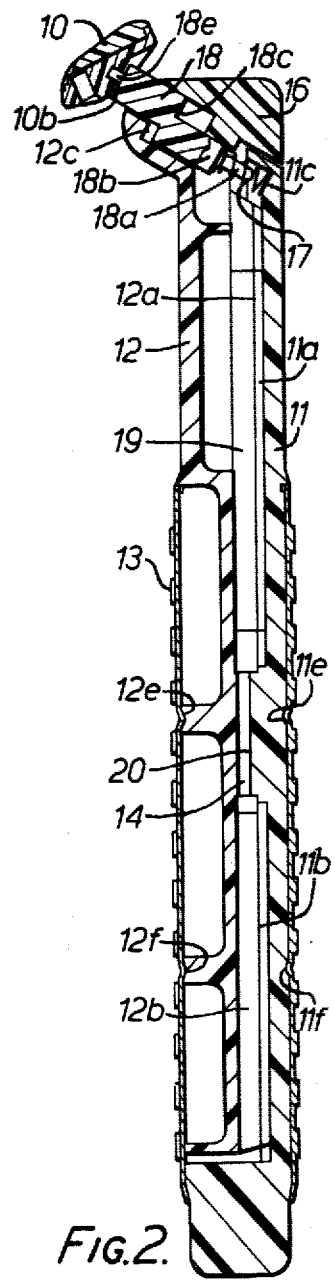
FIG.1.
FIG.2.

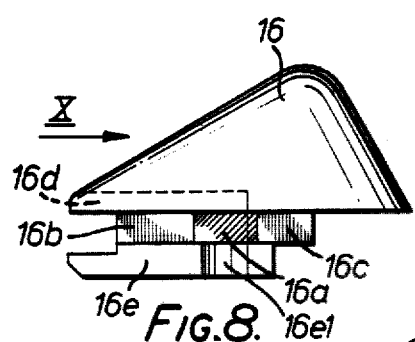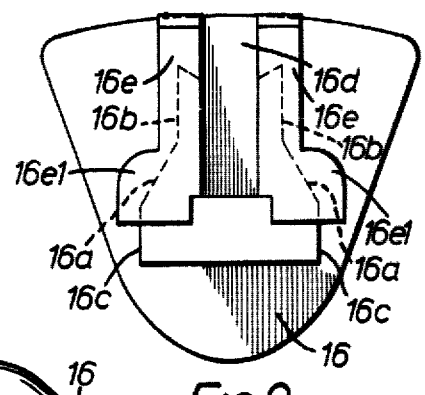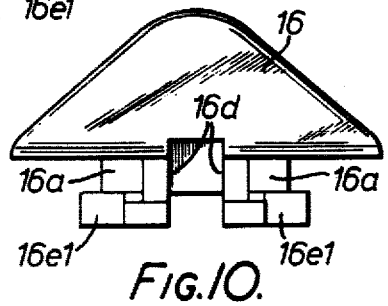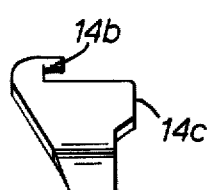

RAZOR WITH REMOVABLY MOUNTED PIVOTAL CARTRIDGE

This invention relates to razors for use with shaving units. By the term 'shaving unit' is meant a substantially rigid member, generally of plastics material, to which is secured one or more razor blades. More particularly, the invention relates to razors of this kind in which the shaving unit can pivot (or rock) relative to the handle in response to the pressures which result when the shaving unit is in contact with the skin during shaving.

According to the present invention there is provided a razor of the kind designed to hold a shaving unit in such a manner that the shaving unit can pivot relative to the handle during shaving, in which the razor comprises two flexible arms each formed at one end with means for pivotal engagement with a shaving unit, and a button which is movable in one direction to flex said arms to disengage said means for pivotal engagement from a shaving unit, and in the opposite direction to move said arms to engage said means for pivotal engagement with a shaving unit.

The invention also provides a razor assembly comprising a shaving unit and a handle, said shaving unit having platform means, blade means, first pivotal mounting means for pivotally connecting said shaving unit to said handle, and means for receiving a biasing force from said handle, said handle including two flexible arms which at one end have second pivotal mounting means complementary to said first pivotal mounting means, said flexible arms being secured to said handle in a region spaced from said second pivotal mounting means, a movable button engaging said flexible arms and movable for flexing said arms to disengage said second pivotal mounting means from said first pivotal mounting means and for reverse movement which frees said flexible arms for engagement of said second pivotal mounting means with said first pivotal mounting means, and means for exerting a biasing force on said means for receiving a biasing force.

One possible construction of razor, and shaving unit for use with the razor, in accordance with the invention will now be described, by way of example only, with reference to the accompanying drawings (the different figures of which are not all to the same scale), in which:

FIG. 1 is a rear elevational view of the razor with the shaving unit in position;

FIG. 2 is a sectional side elevational view of the razor and shaving unit, taken along the line II—II in FIG. 1;

Figure 3:
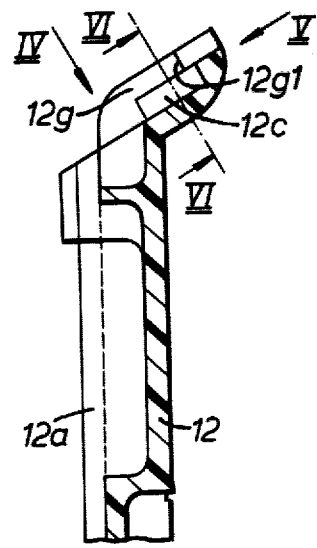
FIG. 3 is a sectional side elevational view of the top part of a lower handle moulding of the razor taken along the line III—III in FIG. 1.
Figure 4:
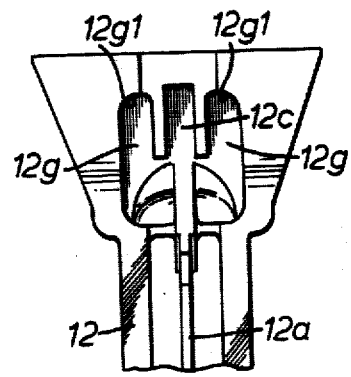
FIG. 4 is a view of the upper part of the lower handle moulding as seen in the direction of the arrow IV in FIG. 3.
Figure 5:
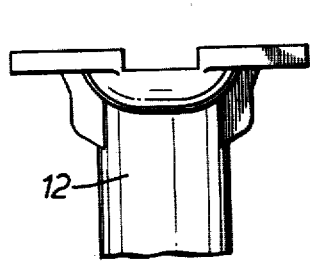
Figure 6:
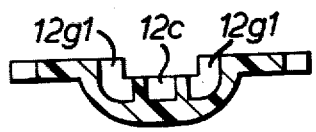
Figure 7:
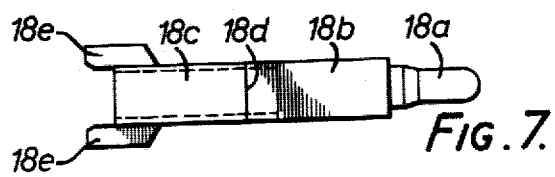

FIG. 5 is a view of the upper part of the lower handle moulding taken in the direction of the arrow V in FIG. 3, FIG. 6 is a sectional view of the upper part of the lower handle moulding taken along the line VI—VI in FIG. 3, FIG. 7 is a plan view of a plunger used in the razor, FIGS. 8, 9 and 10 are respectively a side elevational view, an underside plan, and an end elevational view in the direction of the arrow X in FIG. 8 of a button used in the razor, and FIGS. 11 and 12 are respectively a rear elevational view and a side elevational view of a left hand fork member used in the razor.

This construction of razor is designed for use with shaving units of the well known kind in which one or more razor blades are mounted, a guard surface which contacts the skin during shaving being provided for the cutting edge or cutting edges of the, or each, blade. In the construction which is illustrated diagrammatically in FIGS. 1 and 2, the underside of the shaving unit 10 has two webs 10a, 10a which each have circular recesses 10a1, 10a1 in their outwardly facing surface which form bearing surfaces, each of which is engaged by a pivot, as described hereafter.

As can be seen in FIGS. 1 and 2, the handle consists of eight components, namely an upper handle moulding 11, a lower handle moulding 12, a grip sleeve 13, a lefthand fork member 14, a righthand fork member 15, a button 16, a coil spring 17, and a plunger 18.

The assembly of the components to form the handle consist of mating the handle mouldings 11 and 12, with projections 12a, 12b in handle moulding 12 engaging in recesses 11a, 11b respectively in handle moulding 11 to correctly locate the two mouldings 11, 12, after which they are secured together, for example by ultrasonic welding.

Next, the spring 17 is fitted on the rear stem 18a of the plunger 18 and the middle limb 18b of the plunger 18 is inserted into a central slideway 12c in the head of the handle moulding 12, the spring 17 being compressed with its rear end reacting against the base of a hole 11c in the handle moulding 11. Spring 17 urges the plunger 18 to the forward end of the slideway 12c where its middle limb 18b abuts against the forward end of the slideway 12c. Button 16 is then fitted over the upper end of the assembled upper and lower mouldings 11, 12.

The fork members 14, 15 are then fed sideways into respective side openings 19 left between the assembled handle mouldings 11, 12, the lower end portion of each fork member 14, 15 being wider and fitting in an aperture 20 which extends through the assembled handle mouldings 11, 12 and which serves to locate the fork members 14, 15 in the direction of their longitudinal axes.

Finally, the grip sleeve 13 is passed over the mouldings 11, 12 from the lower end, and when in its correct position is crimped at two positions corresponding to semi-circular grooves 11e, 12e and 11f, 12f in the assembled mouldings 11, 12. The semi-circular grooves 11e, 12e are located at the same axial position as notches (only notch 14a being illustrated—see FIGS. 11 and 12) in the fork members 14, 15, so that the crimping secures the fork members 14, 15 against axial movement as well as securing the handle components.

A groove 16d is provided centrally in the forward portion of the underside of the button to accommodate the forward limb 18c of the plunger 18 with a step 18d between the forward limb 18c and the middle limb 18b being engaged by the rear end surface of the groove 16d.

When the button 16 is moved forward it moves the upper end of each fork member 14, 15 in a direction away from the other to increase the separation between inwardly directed pivots 14b, 15b and thereby frees them from their engagement in the bearing surfaces 10a1, 10a1 in the shaving unit. This is possible because the portion of the limb of each fork member 14, 15 which is not trapped by the grip sleeve 13 can flex outwardly. The outward movement of the upper end of each fork member 14, 15 is effected by the angled ramps 16a, 16a provided on the underside of the button which extend between two more narrowly spaced parallel faces 16b, 16b and two more widely spaced parallel faces 16c, 16c. In the rearward position of the button 16 the inner faces (only the inner face 14c being illustrated—see FIG. 11) on the fork members 14, 15 abut the more narrowly spaced faces 16b, 16b. As the button 16 is moved forwardly these faces on the fork members 14, 15 move along the ramps 16a, 16a and then onto the faces 16c, 16c so that when the button is in its forward position the faces on the fork members 14, 15 rest against the button faces 16c, 16c, which corresponds to the position of maximum separation of the pivots 14b, 15b. Forward movement of the button 16 is limited by engagement of the leading edges 16e1, 16e1, of fingers 16e, 16e with the front face of 12g1, 12g1 of recesses 12g, 12g in the head of the handle moulding 12.

Rearward movement of the plunger 18 moves the button 16 rearwardly due to the engagement of step 18d with the rear surface of the recess, so that the inner faces on the fork member 14, 15, engage the angled ramps 16a, 16a and thereby apply pressure on the button 16 to move it rearwardly so that the inner faces of the fork members come to rest on the more narrowly spaced faces 16b, 16b with the button 16 in its rearward position. Because of the resilience of the untrapped portion of the limbs of each fork member 14, 15, the reaction resulting from the engagement of the inner faces of the fork members with the angled ramps 16a, 16a results in movement of the button 16 being positive in the forward direction, and with a snap-action in the rearward direction. Two prongs 18e, 18e extend forwardly from the head of the plunger 18. The shaving unit 10 has a central web 10b the flat surface of which is engaged by the head of the plunger 18 with a prong extending alongside a respective one of the sides of the central web 10b. (The plunger 18 has been omitted from FIG. 1 in order that the web 10b can be seen clearly).

When the shaving unit 10 is to be removed from the handle the button 16 is moved forwardly and the increasing separation between the pivots 14b/15b moves them out of the bearing surfaces 10a1, 10a1 to release the shaving unit which is thereafter projected forwardly away from the handle by the forward movement of the plunger 18 resulting from the pressure applied by spring 17. The prongs 18e serve the important function of preventing a shaving unit twisting sideways until it is released from the pivots 14b, 15b, and avoids the possibility of a shaving unit being freed from one pivot whilst being retained by the other.

A new shaving unit is picked up by applying the head of the handle to a shaving unit with the button 16 in the forward position in which it is retained after having ejected the previous shaving unit. The engagement of the central web 10b of the shaving unit with the head of the plunger 18 causes rearward movement of the plunger 18 and hence the button 16, as already described, so that the pivots 14b move towards one another and enter the bearing surfaces 10a1, 10a1 in the shaving unit, thereby securing the shaving unit on the handle. In use, the shaving unit 10 can pivot on the pivots 14b in response to the pressures which result from contact of the razor with the skin during shaving. The engagement of the central web 10b with the head of the plunger 18 causes the plunger 18 to be depressed increasingly, with compression of spring 17, as the shaving unit pivots from a mid-position to which the plunger restores it under the reaction of the spring 17 when the shaving unit is withdrawn from the skin.

In a modification to the above described construction the notches in the fork members 14, 15 are omitted, the inside diameter of the grip sleeve 13 being such that the respective tang at the lower end of each fork member 14, 15 abuts the other. The grip sleeve is secured in place by staking or by crimping its lower end to bite into the mouldings 11, 12.

It will be appreciated that the invention provides a razor functioning in the manner described, which consists of few parts whose manufacture is not complicated and whose form facilitates rapid assembly of the razor.

What we claim is:

1. A razor assembly comprising a shaving unit and a handle, said shaving unit having platform means, blade means, first pivotal mounting means for pivotally connecting said shaving unit to said handle, and means for receiving a biasing force from said handle, said handle including two flexible arms which at one end have second pivotal mounting means complementary to said first pivotal mounting means, said flexible arms being secured to said handle in a region spaced from said second pivotal mounting means, a movable button engaging said flexible arms and movable for flexing said arms to disengage said second pivotal mounting means from said first pivotal means and for reverse movement which free said flexible arms for engagement of said second pivotal mounting means with said first pivotal mounting means, means for exerting a biasing force on said means for receiving a biasing force, said button having ramp means which are movable relative to the surface of each flexible arm which engages said button, such relative movements of said ramp means flexing said arms, said ramp means joining a first uninclined portion to a second uninclined portion, both the first and second uninclined portions being parallel to one another and the spacing between the second uninclined portion being greater than the spacing between the first uninclined portion.

2. A razor assembly according to claim 1, wherein said handle includes a stem having recesses in which each of said flexible arms is located, and means trapping in said recesses a portion of each of said flexible arms remote from said second pivotal mounting means, whereby the untrapped portion of each of said flexible arms is free to flex under the control of said movable button.

3. A razor assembly according to claim 1, wherein said means for receiving a biasing force is a web on said shaving unit, and said means for exerting a biasing force has prongs which embrace said web.

* * * * *